(12) United States Patent
Ikushima (10) Patent No.: US 9,952,602 B2
(45) Date of Patent: Apr. 24, 2018

(54) LIQUID MATERIAL APPLICATION DEVICE

(71) Applicant: MUSASHI ENGINEERING, INC., Mitaka-shi, Tokyo (JP)

(72) Inventor: Naotoshi Ikushima, Tokyo (JP)

(73) Assignee: MUSASHI ENGINEERING, INC., Tokyo (JP)

(*) Notice: Subject to any disclaimer, the term of this patent is extended or adjusted under 35 U.S.C. 154(b) by 0 days.

(21) Appl. No.: 15/101,705

(22) PCT Filed: Dec. 3, 2014

(86) PCT No.: PCT/JP2014/081930
§ 371 (c)(1),
(2) Date: Jun. 3, 2016

(87) PCT Pub. No.: WO2015/083722
PCT Pub. Date: Jun. 11, 2015

(65) Prior Publication Data
US 2016/0306364 A1 Oct. 20, 2016

(30) Foreign Application Priority Data

Dec. 6, 2013 (JP) .................................. 2013-253655

(51) Int. Cl.
*B05C 5/00* (2006.01)
*G05B 19/416* (2006.01)
(Continued)

(52) U.S. Cl.
CPC ......... *G05D 7/0635* (2013.01); *B05C 5/0216* (2013.01); *B05C 5/0225* (2013.01);
(Continued)

(58) Field of Classification Search
CPC . B05C 5/0212; B05C 5/0225; B05C 11/1023; B05C 13/00; B05C 5/0216;
(Continued)

(56) References Cited

U.S. PATENT DOCUMENTS

| 4,822,647 A | 4/1989 | Nozaki et al. |
| 5,046,666 A | 9/1991 | Ono |

(Continued)

FOREIGN PATENT DOCUMENTS

| DE | 10 2011 011 545 A1 | 8/2012 |
| ES | 2 264 892 A1 | 1/2007 |

(Continued)

OTHER PUBLICATIONS

International Search Report dated Feb. 10, 2015, issued in International Patent Application No. PCT/JP2014/081930, (Form PCT/ISA/210). (2 pages).

(Continued)

*Primary Examiner* — Matthew G Marini
*Assistant Examiner* — Marissa Ferguson Samreth
(74) *Attorney, Agent, or Firm* — Westerman, Hattori, Daniels & Adrian, LLP (57) ABSTRACT

A liquid material application device can alleviate programming work for drawing a line. The device includes a discharge head (50) for discharging a liquid material, a worktable (25) on which a workpiece is placed, a robot (20) for moving the discharge head and the worktable relative to each other in XYZ directions, and a control unit including an arithmetic device and a storage device for storing an application program, the liquid material application device applying the liquid material to be drawn in the form of a line on the workpiece while the workpiece and the discharge head are moved relative to each other, the control unit includes a first control unit (30) for moving the workpiece and the discharge head relative to each other in accordance with the application program, and a second control unit (40) for controlling a discharge amount of the discharge head.

15 Claims, 3 Drawing Sheets

(51) Int. Cl.
*G05D 7/06* (2006.01)
*B25J 9/16* (2006.01)
*B05C 13/00* (2006.01)
*B25J 9/20* (2006.01)
*B05C 5/02* (2006.01)
*B05C 11/10* (2006.01)

(52) U.S. Cl.
CPC ............ *B05C 13/00* (2013.01); *B25J 9/1679* (2013.01); *B25J 9/20* (2013.01); *G05B 19/416* (2013.01); *B05C 5/0212* (2013.01); *B05C 11/1023* (2013.01); *G05B 2219/45065* (2013.01); *G05B 2219/49056* (2013.01)

(58) Field of Classification Search
CPC ......... B25J 9/1679; B25J 9/20; G05B 19/416; G05B 2219/45056; G05B 2219/49056; G05D 7/0635
See application file for complete search history.

(56) References Cited

U.S. PATENT DOCUMENTS

| | | | |
|---|---|---|---|
| 5,292,066 A * | 3/1994 | Torii | G05B 19/42 239/1 |
| 5,415,693 A * | 5/1995 | Yoneda | H05K 3/1241 118/664 |
| 5,932,012 A * | 8/1999 | Ishida | B05C 5/0212 118/300 |
| 6,060,125 A | 5/2000 | Fujii | |
| 8,588,958 B2 | 11/2013 | Ikushima | |
| 9,374,905 B2 * | 6/2016 | Reid | H05K 3/0085 |
| 2004/0081759 A1 | 4/2004 | Maruyama et al. | |
| 2005/0010329 A1 * | 1/2005 | Bang | B05C 5/0216 700/240 |
| 2005/0188920 A1 * | 9/2005 | Shimoda | B05B 13/0221 118/663 |
| 2007/0009650 A1 * | 1/2007 | Cho | B05C 5/0216 427/8 |
| 2010/0175759 A1 * | 7/2010 | Ikushima | G02F 1/1303 137/15.01 |
| 2011/0184544 A1 * | 7/2011 | Ikushima | G05B 19/4093 700/97 |
| 2011/0236578 A1 * | 9/2011 | Matsui | B05C 5/0216 427/256 |
| 2014/0079871 A1 * | 3/2014 | Lu | H05K 3/3484 427/8 |
| 2015/0079272 A1 * | 3/2015 | Okamura | B05C 5/0212 427/8 |
| 2017/0066005 A1 * | 3/2017 | Ikushima | B05C 5/0212 |

FOREIGN PATENT DOCUMENTS

| | | |
|---|---|---|
| JP | 62-250966 A | 10/1987 |
| JP | 05-231546 A | 9/1993 |
| JP | 05-285434 | 11/1993 |
| JP | 06-59718 A | 3/1994 |
| JP | 2711349 B2 | 2/1998 |
| JP | 11-197571 A | 7/1999 |
| JP | 2001-053089 A | 2/2001 |
| JP | 2003-225877 A | 8/2003 |
| JP | 2005-218971 A | 8/2005 |
| JP | 2006-81954 A | 3/2006 |
| JP | 2009-172452 A | 8/2009 |
| JP | 4497468 B2 | 7/2010 |
| WO | 2009/031305 A1 | 3/2009 |

OTHER PUBLICATIONS

Translation of International Preliminary Report on Patentability (Form PCT/IPEA/409) dated, issued in International Patent Application No. PCT/JP2014/081930. (7 pages).

Third Parties Preissuance Submission dated Sep. 21, 2017, issued in counterpart Japanese Application No. 2015-551528. (4 pages).

Extended (supplementary) European Search Report dated Jun. 19, 2017, issued in counterpart European Patent Application No. 14868304.8. (1 pages).

* cited by examiner

LIQUID MATERIAL APPLICATION DEVICE

TECHNICAL FIELD

The present invention relates to a liquid material application device, which can move a discharge device relative to a workpiece, and which can automatically generate a command to control a discharge amount of the application device for performing a desired application for drawing a line (i.e., desired drawing application) on the workpiece.

The term "application for drawing a line" used in the present invention involves not only an application for drawing of a single continuous line, but also an application for drawing lines with intermittent applications.

BACKGROUND ART

A discharge device called a dispenser is frequently used to form a predetermined pattern of a liquid material in manufacturing of electronic devices. The dispenser is widely used to manufacture a variety of devices ranging from a large-sized type to a small-sized type. For example, the dispenser is used in a step of applying a phosphor or an adhesive in a linear form on flat display panels, which are represented by a liquid crystal panel, an organic EL panel, and a plasma display panel (PDP), and a step of applying an adhesive to fix a cover of a smartphone in a liner form along an outer periphery of the cover.

Application work using the dispenser is performed by discharging the liquid material from a nozzle while the nozzle and a worktable are moved relative to each other in accordance with an application pattern. In the case of drawing a line in accordance with the application pattern having a corner, it is known that a problem occurs with variations in a width of the drawn line due to reduction of a relative moving speed of the nozzle in the corner.

Among dispensers of various discharge types, one example is an air type dispenser in which air supplied from a compressed air source is applied to a liquid material in a reservoir, whereupon the liquid material is discharged through a nozzle in communication with the reservoir.

As the air type dispenser aiming to suppress deformation of the pattern in the corner in the case of the drawing application, Patent Document 1, for example, discloses an applicator that is used in an application method of drawing a rectangular pattern on a substrate, and that is able to suppress generation of vibration in a corner and to apply a paste in a proper amount by reducing a relative speed between a nozzle and a substrate at a start point of the corner and lowering discharge pressure of the paste at the same time, and then, after passing the corner, by increasing the relative speed between the nozzle and the substrate and raising the discharge pressure of the paste at the same time before reaching an end point of the corner. The above-mentioned control is executed in accordance with pattern data stored in a RAM of a microcomputer, and the start and end positions of the corner are determined with measurement using a linear scale.

Programming, described below, is required to realize a desired application for drawing a line with an application device that includes a discharge device, a worktable, and a relative-moving robot (XYZ-direction moving device) for moving the discharge device and the worktable relative to each other.

First, programming for relative movement commands to relatively move the relative-moving robot in accordance with the application pattern is required. Next, programming for discharge an amount control commands to control discharge amounts at individual application positions on the application pattern is required. The discharge amount control commands are each, for example, a command of lowering air pressure for the discharge, a command of shortening a distance between an annular valve seat in communication with a discharge port and a valve member, or a command of reducing a rotation speed of a screw for giving a propulsion force. In order to change the discharge amount at XY-coordinates in a place where the relative moving speed is changed, such as the corner, it is further required to transmit the discharge amount control command in conjunction with the relative movement command.

For example, Patent Document 2 states, in paragraphs [0085] to [0093], that an automatic application process is executed by programming operations to move a robot arm along an application pattern, programming start and end timings of paint application by a servo gun and so on, recording programming data in a PLC, and reproducing the recorded data.

The program for relative movement is programmed on a character base using letters, numeral, symbols, etc. in some cases, or it is automatically generated by drawing a figure with an applied CAD program in other cases.

The applicant proposes, in Patent Document 3, a program comprising the steps of displaying a text input screen, displaying a figure input screen, outputting in real time movement information of a working device, which has been input through the text input screen, on the figure input screen as information representing a path on a two-dimensional plane and a height of the path, outputting in real time movement information of the working device, which has been input through the figure input screen, on the text input screen on a character base, displaying a 3D display screen that outputs movement information of the working device as a path in a three-dimensional space on the basis of the movement information of the working device, which has been input through the text input screen and/or the figure input screen, and automatically generating an input (relative) movement program for the working device.

CITATION LIST

Patent Documents

Patent Document 1: Japanese Patent Laid-Open Publication No. 2005-218971
Patent Document 2: Japanese Patent Laid-Open Publication No. 2009-172452
Patent Document 3: International Application Pamphlet No. 2009/031305

SUMMARY OF INVENTION

Technical Problem

Programming for control of the moving speed and the discharge amount in a linked way has been required so far to realize the desired application for drawing a line (i.e., desired drawing application). However, work of programming for control of different parameters in a linked way takes a lot of labor and time. It has been hence demanded to alleviate the programming work in such a situation. Conditions for making uniform the fatness of an applied line must be found with work of, for example, dividing an application locus in a corner into several segments, and adjusting the moving speed and the discharge amount for each of the segments through a trial and error process. Such work implies that control codes of the moving speed and the discharge amount are repeatedly corrected in conjunction with each other.

The above-described situation is more serious in the case where needs for manufacturing of a wide variety of products in small quantities are to be satisfied.

Accordingly, an object of the present invention is to provide a liquid material application device that can alleviate programming work necessary to realize a desired application for drawing a line (i.e., desired drawing application).

Solution to Problem

A liquid material application device according to the present invention comprises a discharge head for discharging a liquid material, a worktable on which a workpiece is placed, a robot for moving the discharge head and the worktable relative to each other in XYZ directions, and a control unit including an arithmetic device and a storage device for storing an application program, the liquid material application device applying the liquid material to be drawn in the form of a line on the workpiece while the workpiece and the discharge head are moved relative to each other, wherein the control unit includes a first control unit for moving the workpiece and the discharge head relative to each other in accordance with the application program, and a second control unit for controlling a discharge amount of the discharge head, the first control unit has a function of outputting speed information of the discharge head relative to the workpiece at a predetermined timing, and the second control unit has a function of automatically controlling the discharge amount on the basis of the speed information output from the first control unit.

Here, the first control unit and the second control unit are implemented as one physically integral control unit in some cases, and they are implemented as physically separate control units in other cases.

In the liquid material application device described above, the speed information of the discharge head, which is output from the first control unit, may be a scalar quantity of a relative moving speed between the workpiece and the discharge head, the first control unit or the second control unit may include a conversion unit for outputting discharge amount information corresponding to the scalar quantity, and the second control unit may have a function of automatically controlling the discharge amount on the basis of the discharge amount information output from the conversion unit. Furthermore, the conversion unit may include a conversion table that determines the discharge amount information corresponding to the scalar quantity, or the conversion unit may include a conversion formula used for calculating the discharge amount corresponding to the scalar quantity. In this connection, preferably, the conversion table determines the discharge amount as five or more different values.

Here, the conversion unit is, for example, a function module that is implemented with software stored in a storage device of the first or second control unit.

In the liquid material application device described above, the first control unit may have a function of synchronizing control of the discharge amount of the discharge head by the second control unit and relative movement of the discharge head with each other.

In the liquid material application device described above, the first control unit may be mounted on the robot, and the second control unit may be connected to the robot via a cable.

Advantageous Effect of Invention

According to the present invention, programming work necessary to realize the desired application for drawing a line (i.e., the desired drawing application) can be alleviated.

DESCRIPTION OF EMBODIMENT

An embodiment for carrying out the present invention will be described below.

Figure 1:
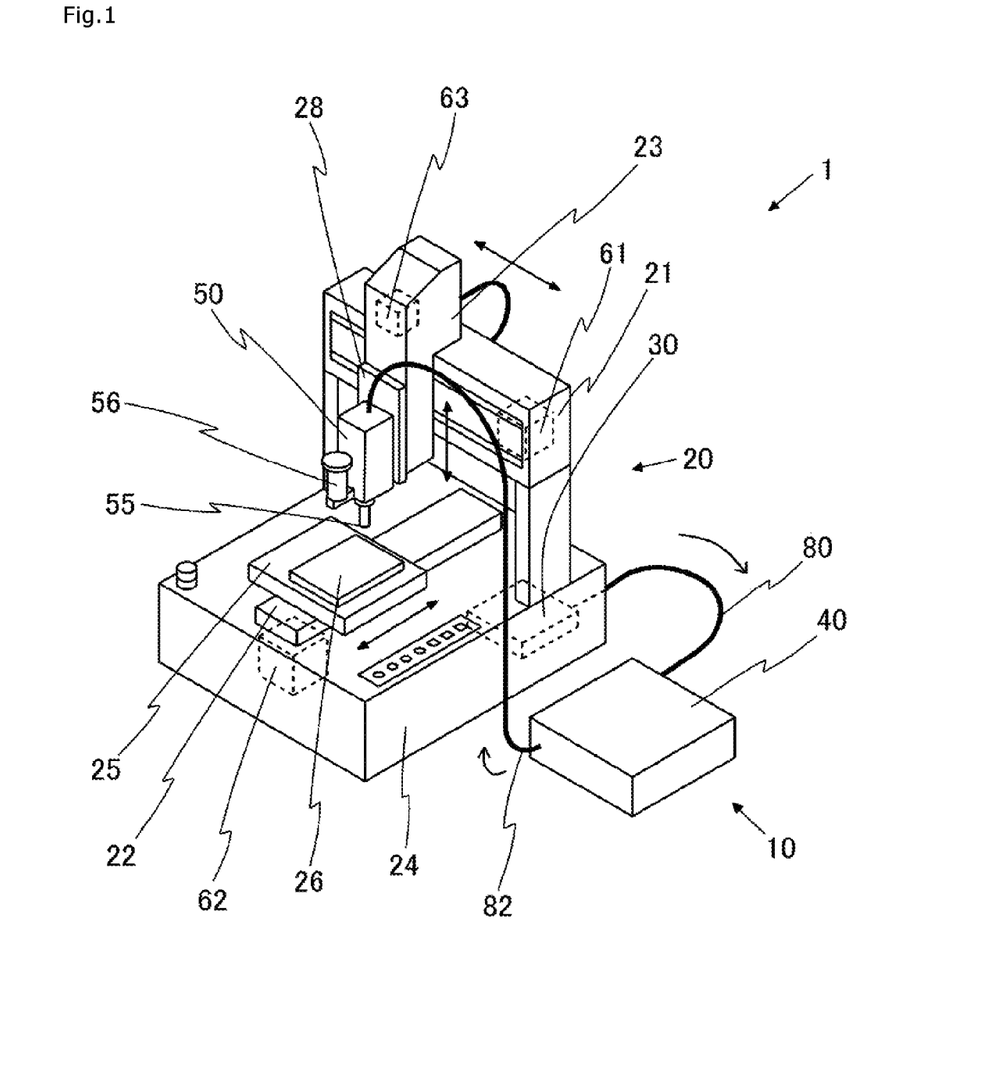
FIG. 1 is a perspective view illustrating an external appearance of an application device according to the present invention.

As illustrated in FIG. 1, an application device 1 of the present invention includes, as main components, a dispenser 10 and a robot 20. Those components will be described in detail below.

<Dispenser>

The dispenser 10 includes, as main components, a dispense controller 40 and a dispense head 50.

The dispense controller 40 includes a storage device and an arithmetic device, and outputs discharge operation commands to control a discharge operation of the dispense head 50.

The dispense head 50 includes a discharge unit 53 and a discharge amount controller 64, and discharges a liquid material from a discharge port 55 under desired discharge conditions in accordance with a discharge operation command signal that is output from the dispense controller 40.

The dispenser 10 employed, by way of example, in the embodiment is a plunger type dispenser. Here, the term "plunger type" implies a type of discharging the liquid material by the action of a plunger that is moved to slide within a metering tube in a reciprocating manner. Stated in another way, the plunger type dispenser discharges the liquid material in response to reduction in a volume of the metering tube, which is caused by moving the plunger forward. Thus, the plunger type dispenser discharges the liquid material on the basis of the same principle as that of an injector.

Figure 2:
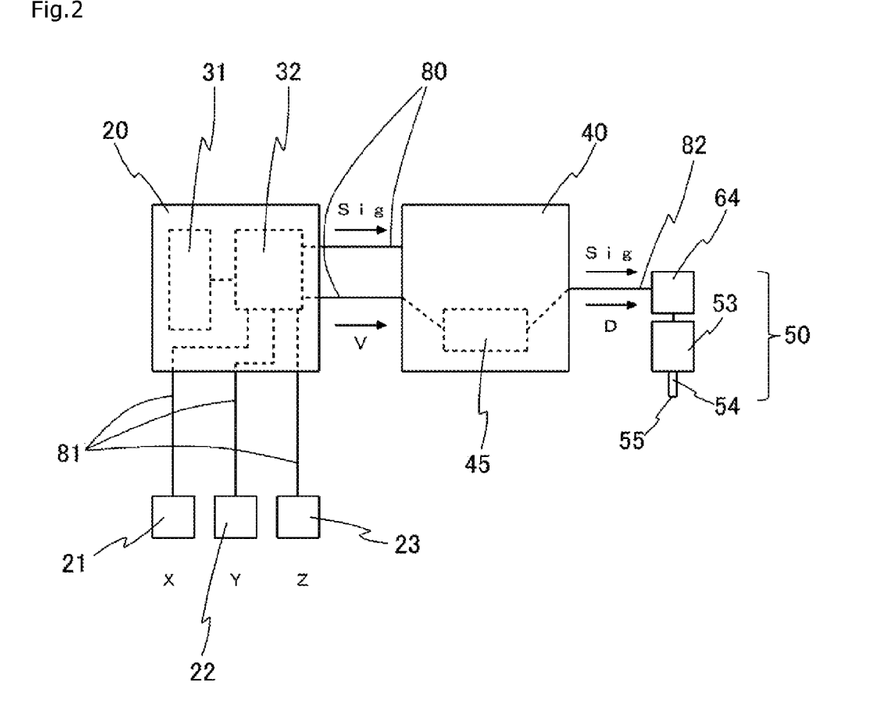
FIG. 2 is a block diagram illustrating a control unit and associated elements.

The discharge unit 53 included in the dispense head 50 of the embodiment includes a metering tube (not illustrated), a plunger (not illustrated), and a nozzle 54 having the discharge port 55 (see FIG. 2). The discharge amount controller 64 is a stepping motor (discharge motor) that moves the plunger to reciprocate within the metering tube. Thus, reciprocating movement of the plunger is controlled by rotation of the discharge motor. More specifically, as the number of rotations of the discharge motor is increased, a distance through which the plunger moves forward is prolonged. As a rotation speed of the discharge motor is increased, a speed at which the plunger moves forward is increased. The liquid material is sucked into the metering tube (not illustrated) from a syringe 56 by moving the plunger backward.

<Robot>

The robot 20 is a desktop device including an X-axis moving device 21, a Y-axis moving device 22, a robot head 23, a bench 24, and a robot controller 30.

The X-axis moving device 21 is a gate-shaped device supported by two posts, and it includes, as a drive source, an X-axis drive source 61. The robot head 23 is disposed on the X-axis moving device 21 such that the robot head 23 can be moved to an arbitrary coordinate in the X-direction.

The Y-axis moving device 22 is mounted on the bench 24, and it includes, as a drive source, a Y-axis drive source 62. A table 25 is disposed on the Y-axis moving device 22 such that the table 25 can be moved to an arbitrary coordinate in the Y-direction. A workpiece 26 is detachably held on the table 25.

The robot head 23 includes a moving member 28 and a Z-axis drive source 63, and constitutes a Z-axis moving device including, as a drive source, a Z-axis drive source 63. Thus, the robot head 23 is able to move the moving member 28 to an arbitrary coordinate in the Z-direction by the Z-axis drive device 63. Because the dispense head 50 is detachably fixed to the moving member 28 in the form of a plate, the dispense head 50 is also movable to an arbitrary coordinate in the Z-direction by the Z-axis moving device.

The drive sources 61 to 63 are each constituted by, e.g., a stepping motor, a servo motor, or a linear motor.

The robot controller 30 for controlling the operation of the robot is incorporated inside the bench 24.

The liquid material can be applied and drawn in a desired application pattern by moving the dispense head 50 and the workpiece 26 relative to each other by the robot 20. The application pattern includes at least one point where a relative moving speed of the dispense head 50 is changed while the liquid material is discharged from the dispense head 50.

<Control Unit>

A control unit in the embodiment is constituted by the robot controller 30 and the dispense controller 40. In the following description, the robot controller 30 is called a first control unit 30, and the dispense controller 40 is called a second control unit 40. Unlike the embodiment in which the first control unit and the second control unit are physically separate units, the first control unit and the second control unit may be implemented as one physically integral control unit in some cases.

As illustrated in FIG. 2, the first control unit 30 includes a storage device 31 that stores an application program describing the relative movement commands, and an arithmetic device 32 that executes the application program.

The first control unit 30 implements relative movement of the dispense head 50 and the workpiece 26 by executing the application program, and by transmitting the relative movement commands to the X-axis moving device 21, the Y-axis moving device 22, and the Z-axis moving device 23 via cables B 81.

The application program describes commands for moving the XYZ-axis moving devices (21 to 23) to designated coordinates through a linear or curved path, a command for setting the moving speed of the dispense head 50, a discharge start command, a discharge stop command, etc. The application program in the embodiment does not describe any command regarding control of the discharge amount. The application program in the embodiment is processed by a method using an interpreter.

The second control unit 40 includes a storage device and an arithmetic device, and transmits discharge operation commands to the dispense head 50 via a cable C 82. The discharge operation commands include the discharge start command, the discharge stop command, and a discharge amount control command.

The second control unit 40 further includes a conversion unit 45 that is implemented with software stored in the storage device. The conversion unit 45 in the embodiment contains a relational formula or a conversion table representing a relation between a moving speed V of the dispense head 50 and a control variable D of the discharge amount controller 64. The conversion unit 45 applies the moving speed V to the relational formula or the conversion table and calculates the control variable D to realize a line width that has been set. The moving speed V is a scalar quantity of the relative moving speed between the workpiece 26 and the dispense head 50.

In the embodiment, since the discharge amount controller 64 is the discharge motor, the control variable D is a motor rotation speed (i.e., the number of rotations per unit time). The relational formula or the conversion table needs to be previously prepared on the basis of theoretical values or experimental values. The relational formula or the conversion table preferably sets five or more different values of the discharge amount step by step. To obtain applied lines of plural widths with one application device 1, the relational formula or the conversion table needs to prepared in the same number as that of the widths of the applied lines to be obtained.

The first control unit 30 and the second control unit 40 are electrically connected to each other via cables A 80 for communication therebetween. The discharge start and end commands set in the application program, and the moving speed V of the dispense head 50 are transmitted from the first control unit 30 to the second control unit 40. Here, the moving speed V of the dispense head 50 is transmitted to the second control unit 40 when a moving speed change command is issued from the application program, or at intervals of a predetermined time. The second control unit 40 may obtain the moving speed V by a polling method of sending a transmission request from the second control unit 40 to the first control unit 30.

When the second control unit 40 receives the moving speed of the dispense head 50, optimum control conditions for the discharge amount controller 64 are determined in accordance with the relational formula or the conversion table in the conversion unit 45.

<Control Example of Discharge Amount>

Figure 3:
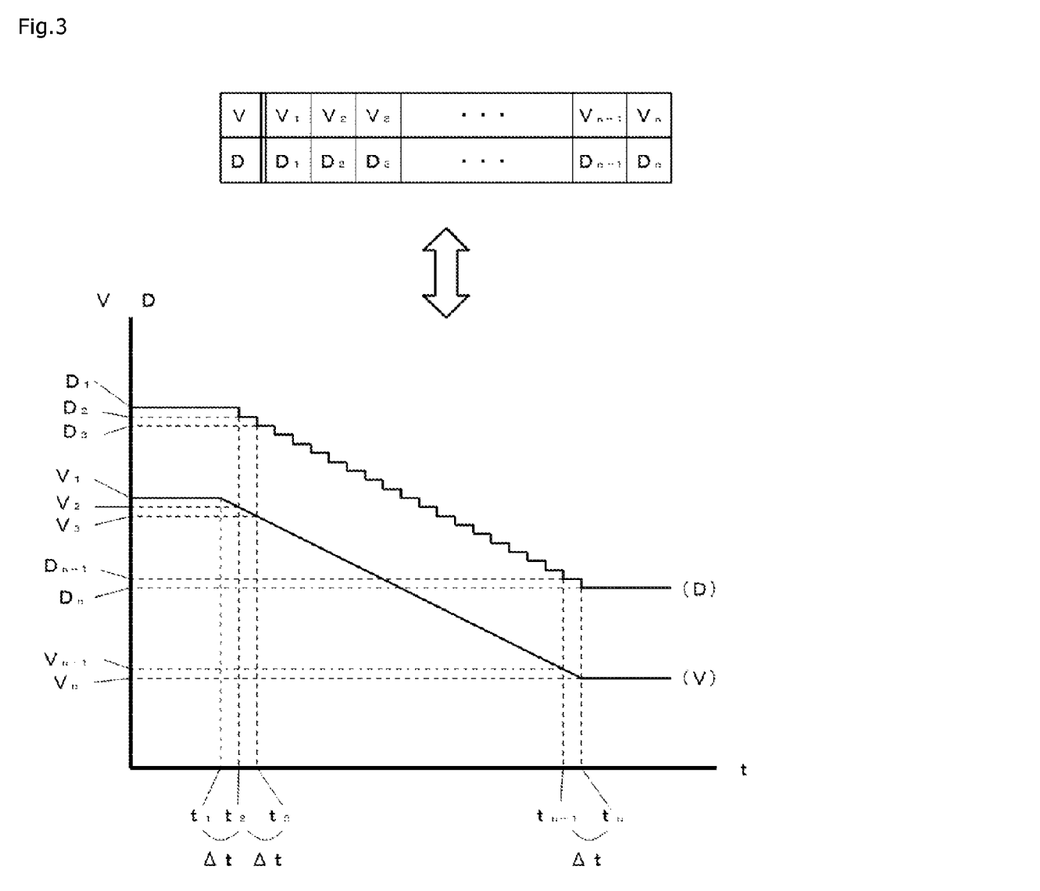
FIG. 3 is a chart referenced to explain a control example of a discharge amount.

An upper stage in FIG. 3 illustrates an image of the conversion table representing the control variables $D_1$ to $D_n$ of the discharge amount controller 64 corresponding to the moving speeds $V_1$ to $V_n$ of the dispense head 50, respectively. Because the moving speeds $V_1$ to $V_n$ are described as scalar quantities (absolute values), the same conversion table can be used in both modes of acceleration and deceleration.

A lower stage in FIG. 3 illustrates a graph representing the discharge amount control when the moving speed of the dispense head 50 is decelerated from $V_1$ to $V_n$.

In an initial state in FIG. 3, the dispense head 50 is controlled to move at the moving speed $V_1$, and the discharge motor serving as the discharge amount controller 64 is controlled to rotate at the rotation speed $D_1$ per unit time. Information of the moving speed of the dispense head 50 is transmitted from the first control unit 30 to the second control unit 40 per $\Delta t$. When the moving speed V changes, the conversion unit 45 in the second control unit 40 calculates the corresponding control variable D in accordance with the conversion table.

When the moving speed of the dispense head 50 reduces to $V_2$, the second control unit 40 issues a deceleration command, and the discharge amount controller 64 decelerates the rotation speed to $D_2$. Similarly, when the moving speed reduces to $V_3, V_4, \ldots, V_{n-1}$ step by step, the second control unit 40 issues corresponding deceleration commands, and the discharge amount controller 64 decelerates the rotation speed to $D_3, D_4, \ldots, D_{n-1}$ successively. When the moving speed of the dispense head 50 reaches $V_n$ and is maintained there, the second control unit 40 issues a deceleration command, and the discharge amount controller 64 decelerates the rotation speed to $D_n$. During a period in which the moving speed is maintained at $V_n$, any speed change command is not issued from the second control unit 40, and hence the discharge amount controller 64 maintains the rotation speed $D_n$.

Although the lower stage in FIG. 3 illustrates the case where the moving speed V of the dispense head 50 reduces linearly, the discharge amount controller can be controlled in a similar manner to that in the above case even when the moving speed V changes nonlinearly. Thus, it is just required to select, from the conversion table, the control variable D of the discharge amount controller 64 corresponding to the moving speed V of the dispense head 50, and to control the discharge amount controller 64 in accordance with the control variable D.

As an alternative, the relational formula and the conversion table may be used in a combined manner, for example, such that the conversion table is used in a certain speed range, and the relational formula is used outside the certain speed range.

<Actual Process of Application Work>

The application device 1 automatically carries out application work by executing an application program that has been prepared in advance.

When the application program stored in the storage device 31 of the first control unit is read out and executed by the arithmetic device 32, the relative movement commands are transmitted to the X-axis moving device 21, the Y-axis moving device 22, and the Z-axis moving device 23, and the discharge start and end commands are transmitted to the second control unit 40. Specifications may be modified such that the discharge end command is not included in the application program, and that the discharge is ended after the lapse of a certain time from the discharge start command.

In parallel to the execution of the application program, the information of the moving speed V of the dispense head 50 is periodically transmitted to the second control unit 40. Here, the "information of the moving speed V" implies, in the embodiment, speed information of movement in an X-Y plane, which is implemented by the X-axis moving device 21 and the Y-axis moving device 22. However, it is also of course possible to periodically transmit speed information of movement in another coordinate system set in, e.g., an X-Z plane, a Y-Z plane, or an X-Y-Z space unlike the embodiment.

Upon receiving the discharge start and end commands and the information of the moving speed V from the first control unit 30, the second control unit 40 transmits the discharge operation commands to the dispense head 50. The discharge start and end commands in the discharge operation commands are described in the application program, but the discharge amount control command in the discharge operation commands is not described in the application program. In other words, the second control unit 40 dynamically generates the discharge amount control command on the basis of the moving speed V of the dispense head 50, which is described in the application program. In the embodiment, since the discharge amount controller 64 is a stepping motor, a discharge amount increase command is a command of increasing the motor rotation speed (i.e., the number of rotations per unit time), and a discharge amount decrease command is a command of decreasing the motor rotation speed (i.e., the number of rotations per unit time). Thus, the second control unit 40 outputs the discharge amount increase command when the moving speed of the dispense head 50 has increased, and outputs the discharge amount decrease command when the moving speed of the dispense head 50 has decreased. Because the discharge amount is controlled by the second control unit 40 substantially in real time, the application of the liquid material to draw a line in a uniform width can be realized with less programming work than required so far.

<Synchronizing Function>

The present invention is featured in that the moving speed of the dispense head and the discharge amount thereof are controlled in real time. However, timing in the control of the discharge amount may be slightly deviated depending on application conditions in some cases. To cope with such a deviation, the application device 1 in a preferred embodiment includes a function of synchronizing the change of the moving speed of the dispense head and the control of the discharge amount thereof.

The synchronizing function is implemented by evenly delaying the relative movement commands, which are transmitted from the arithmetic device 32 to the XYZ-axis moving devices (21 to 23), through a predetermined time. Here, the delay time necessary for the synchronization is a time taken until, after the second control unit 40 has received the information of the moving speed V of the dispense head 50, the discharge amount control command is transmitted to the dispense head 50 and change of the discharge amount is actually started. Alternatively, the arithmetic device 32 may read the application program in advance, and the discharge amount control command may be transmitted before the predetermined time from a timing at which the moving speed V is changed.

<Discharge Devices of Different Types>

While the embodiment has been described in connection with an example of the dispenser in which an amount of forward movement of the plunger is controlled by the discharge motor, various types of dispensers can be used. The discharge amount controller 64 is modified depending on the types of dispensers, by way of example, as follows.

In the case of an air type dispenser in which a liquid material is discharged from a nozzle by applying air under regulated pressure to the liquid material in a reservoir for a desired time, the discharge amount controller is a regulator, and control parameters for the discharge amount are discharge pressure and a time during which the discharge pressure is applied.

In the case of a tubing type dispenser provided with a rotary tubing mechanism, the discharge amount controller is a motor, and the control parameters for the discharge amount are a rotating direction, the number of rotations, and a rotation speed.

In the case of a jet type dispenser in which a liquid material is discharged from a nozzle tip in a flying way by impinging a valve member against a valve seat that is disposed at an end of a flow path in communication the nozzle or by stopping the valve member immediately before the valve member is impinged against the valve seat, the discharge amount controller is a solenoid valve, and the control parameter for the discharge amount is a discharge tact (on-off interval of the solenoid valve).

According to the above-described application device of the present invention, since it is no longer required to describe the discharge amount control command depending on the moving speed of the discharge device that is held on the robot, a time necessary for preparing the application program can be shortened significantly. Furthermore, since a code quantity of the application program is reduced as a whole, factors causing program errors are reduced, and a time of debugging work is also shortened significantly.

In addition, since an operator is just required to learn only knowledge necessary for programming of the relative movement commands that determine the operation of the robot, it is also possible to shorten an operator training period.

LIST OF REFERENCE SIGNS

1: application device
10: dispenser
20: robot
21: X-axis moving device
22: Y-axis moving device
23: robot head (Z-axis moving device)
24: bench
25: table
26: workpiece
28: moving member
30: robot controller (first control unit)
31: storage device
32: arithmetic device
40: dispense controller (second control unit)
45: conversion unit
50: dispense head
53: discharge unit
54: nozzle
55: discharge port
56: syringe
61: X-axis drive source
62: Y-axis drive source
63: Z-axis drive source
64: discharge amount controller
80: cable A
81: cable B
82: cable C

The invention claimed is:

1. A liquid material application device comprising:
a discharge head including a discharge port for discharging a liquid material;
a discharge amount controller for controlling an amount of the liquid material discharged from the discharge port;
a worktable on which a workpiece is placed;
a robot for moving the discharge head and the worktable relative to each other; and
a control unit including an arithmetic device and a storage device for storing an application program,
the liquid material application device applying the liquid material to be drawn in the form of a line on the workpiece while the workpiece and the discharge head are moved relative to each other,
wherein the application program contains a relative movement command for moving the workpiece and the discharge head relative to each other in accordance with an application pattern,
the control unit includes a first control unit for moving the workpiece and the discharge head relative to each other in accordance with the application program comprises a storage device and an arithmetic device, and a second control unit for controlling a discharge amount of the discharge head comprises a storage device and an arithmetic device,
the application program contains description of a scalar quantity of a relative moving speed between the workpiece and the discharge head,
the first control unit has a function of transmitting the scalar quantity to the second control unit, and
the second control unit includes a conversion unit for outputting discharge amount information corresponding to the scalar quantity and has a function of automatically controlling the discharge amount of the discharge head by, on the basis of the scalar quantity transmitted from the first control unit, dynamically generating the discharge amount control command of the discharge amount controller for causing the discharge head to apply the liquid material and to draw a line in a uniform width.

2. The liquid material application device according to claim 1, wherein the first control unit has a function of transmitting the scalar quantity to the second control unit in parallel to execution of the application program.

3. The liquid material application device according to claim 1, wherein the conversion unit includes a conversion table that determines the discharge amount information corresponding to the scalar quantity.

4. The liquid material application device according to claim 3, wherein the conversion table is constituted by five or more conversion tables that determine the discharge amounts corresponding to five or more different line widths.

5. The liquid material application device according to claim 3, wherein the conversion table is used in both modes of acceleration and deceleration in common.

6. The liquid material application device according to claim 1, wherein the conversion unit includes a conversion formula used for calculating the discharge amount corresponding to the scalar quantity.

7. The liquid material application device according to claim 1, wherein the first control unit has a function of synchronizing control of the discharge amount of the discharge head by the second control unit and relative movement of the discharge head with each other.

8. The liquid material application device according to claim 1, wherein the first control unit is mounted on the robot, and the second control unit is constituted by a dispense controller that is a physically separate unit, and that is connected to the robot via a cable.

9. The liquid material application device according to claim 8, wherein the discharge head includes one selected from among a plunger type dispenser, an air type dispenser, a tubing type dispenser, and a jet type dispenser.

10. The liquid material application device according to claim 8, wherein the discharge amount controller is mounted on the discharge head.

11. The liquid material application device according to claim 8, wherein the discharge head includes a jet type dispenser in which a liquid material is discharged from a nozzle tip in a flying way by impinging a valve member against a valve seat that is disposed at an end of a flow path in communication the nozzle or by stopping the valve member immediately before the valve member is impinged against the valve seat, and wherein the discharge amount controller is a solenoid valve and the discharge amount control command includes a command for controlling an on-off interval of the solenoid valve.

12. The liquid material application device according to claim 1, wherein the conversion unit includes a conversion table that determines the discharge amount information corresponding to the scalar quantity and a conversion formula used for calculating the discharge amount corresponding to the scalar quantity, and
the conversion table is used when the relative moving speed is within a predetermined speed range, and the conversion formula is used when the relative moving speed is outside the predetermined speed range.

13. The liquid material application device according to claim 1, wherein the first control unit has a function of synchronizing control of the discharge amount of the discharge head and relative movement of the discharge head with each other by delaying a timing of transmission of the relative movement command to the robot through a predetermined time, or by previously reading the relative movement command issued to the robot and causing the second control unit to transmit the discharge amount command to the discharge head before a predetermined time from change of the relative movement command.

14. The liquid material application device according to claim 13, wherein the discharge head includes one selected from among a plunger type dispenser, an air type dispenser, a tubing type dispenser, and a jet type dispenser.

15. The liquid material application device according to claim 1, wherein the conversion unit is a function module that is implemented with software stored in the storage device of the second control unit.

* * * * *